UNITED STATES PATENT OFFICE.

RICHARD BENJAMIN WRIGHT, OF EAST ISLIP, NEW YORK.

COMPOSITION FOR CONTACT-SPRAYS.

1,248,977.      Specification of Letters Patent.      Patented Dec. 4, 1917.

No Drawing.      Application filed August 10, 1915. Serial No. 44,738.

*To all whom it may concern:*

Be it known that I, RICHARD BENJAMIN WRIGHT, a citizen of the United States, residing at East Islip, in the county of Suffolk and State of New York, have invented a new and useful Composition for Contact-Sprays, of which the following is a specification.

This invention relates to a contact spray which can be successfully used for destroying sucking insects and scale, and controlling worms, on all kinds of vegetation, the object of the invention being to provide a composition of matter for this purpose which is essentially non-poisonous in its application, which can be used upon the buds, flowers or fruit at any time during the growing season without harmful effects upon the vegetation, and which is slow to congeal and can be prepared with a minimum amount of labor.

Further objects of the invention are to provide a composition of matter for use as a contact spray, which can be handled commercially in the form of a powder and mixed with water preparatory to use, thereby reducing transportation charges, which is non-injurious to farm yard fowls and birds, which will neither injure the blossoms or interfere with buds, which has a cleansing action upon the vegetation, and which solves the problem of blight by removing the insect cause without staining the leaves, flowers or fruit.

My composition consists of a mixture of soap powder, petrolatum, and Cayenne pepper which is initially prepared and put up in the form of a powder so that it can be handled and shipped for the minimum charges, the powder being adapted to be mixed with water, in a manner to be hereinafter described, before being used. As the result of experiments I find soap powder preferable to the ordinary soft or hand soap, not only in facilitating the preparation of the compound in powder form, but the soap powder forms with the petrolatum a superior emulsion in all respects, such as ease of mixing and uniformity in strength and composition.

In preparing the composition I prefer to use the ingredients in substantially the following proportions. However, the amount of Cayenne pepper may be varied according to the strength desired as determined by the nature and condition of the vegetation upon which the compound is to be used.

Commercial soap powder_____ 5 pounds.
Commercial petrolatum_____ 1 pound.
Commercial Cayenne pepper_____ 1 pound.

In mixing the ingredients the petrolatum is cut into the soap powder until the latter is substantially coated. The Cayenne pepper is then added and the process continued until the ingredients are thoroughly mixed and the mass is practically of a uniform color. In this concentrated powder form the composition of matter is intended to be packed and transported to the user.

In using the composition the mass of powder must be reduced by boiling water to a liquid form, and the hot liquid in turn poured into the required quantity of cold water, fusing and forming a complete emulsion for spraying purposes. In practice it has been found that good results can be obtained where the hot liquid is poured into a mass of approximately one hundred and forty gallons of cold water.

The resultant spray is substantially tasteless and odorless, and acts upon scale and sucking insects to destroy them by covering them with a thin wash of the composition. Worms are also deterred from mutilating the foliage by providing a warm substance in the coating. This is all accomplished without inflicting injury upon the foliage, fruit or flowers.

What I claim as new and desire to secure by Letters Patent, is:—

1. A composition of matter for use as a contact spray, comprising substantially five pounds of soap powder, substantially one pound of petrolatum, and Cayenne pepper in sufficient quantity to produce the desired strength as determined by the nature and condition of the vegetation upon which the composition is to be used.

2. A base in the form of a powder for dilution with water to form a contact spray, said base comprising substantially five pounds of soap powder, substantially one pound of petrolatum, and Cayenne pepper in sufficient quantity to produce the desired strength as determined by the nature and condition of the vegetation upon which the composition is to be used.

RICHARD BENJAMIN WRIGHT.

Witnesses:
 BARBARA E. WRIGHT,
 EDWARD I. GORTON.